A. McWHORTER.
POTATO PLANTER.
APPLICATION FILED FEB. 4, 1919.

1,314,683.

Patented Sept. 2, 1919.
3 SHEETS—SHEET 1.

INVENTOR:
Allen McWhorter
BY Wiedersheim + Fairbank
ATTORNEYS.

A. McWHORTER.
POTATO PLANTER.
APPLICATION FILED FEB. 4, 1919.
1,314,683.
Patented Sept. 2, 1919.
3 SHEETS—SHEET 2.
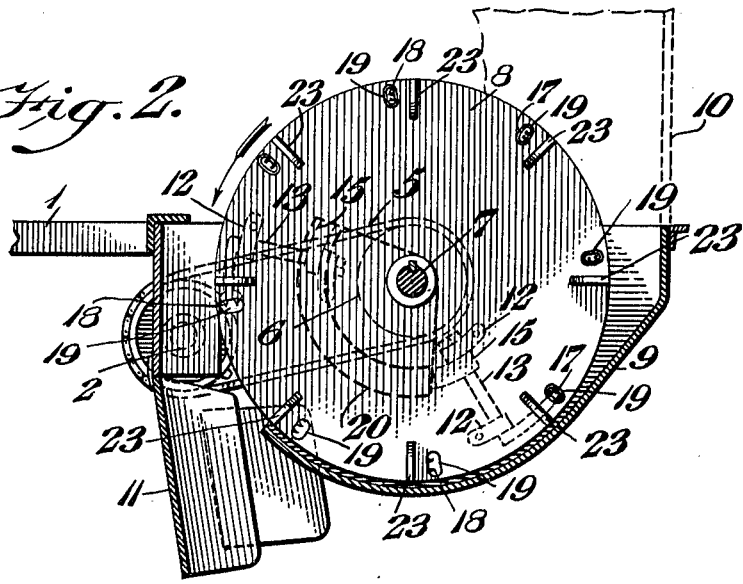
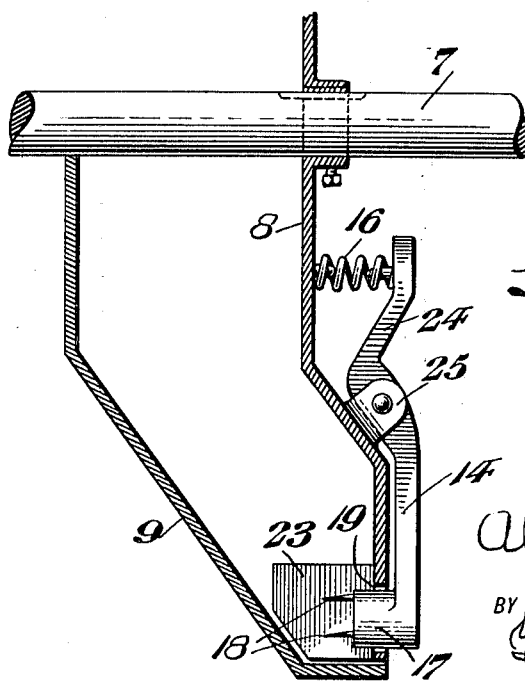
INVENTOR:
Allen McWhorter.
BY Niedersheim & Fairbanks.
ATTORNEYS.

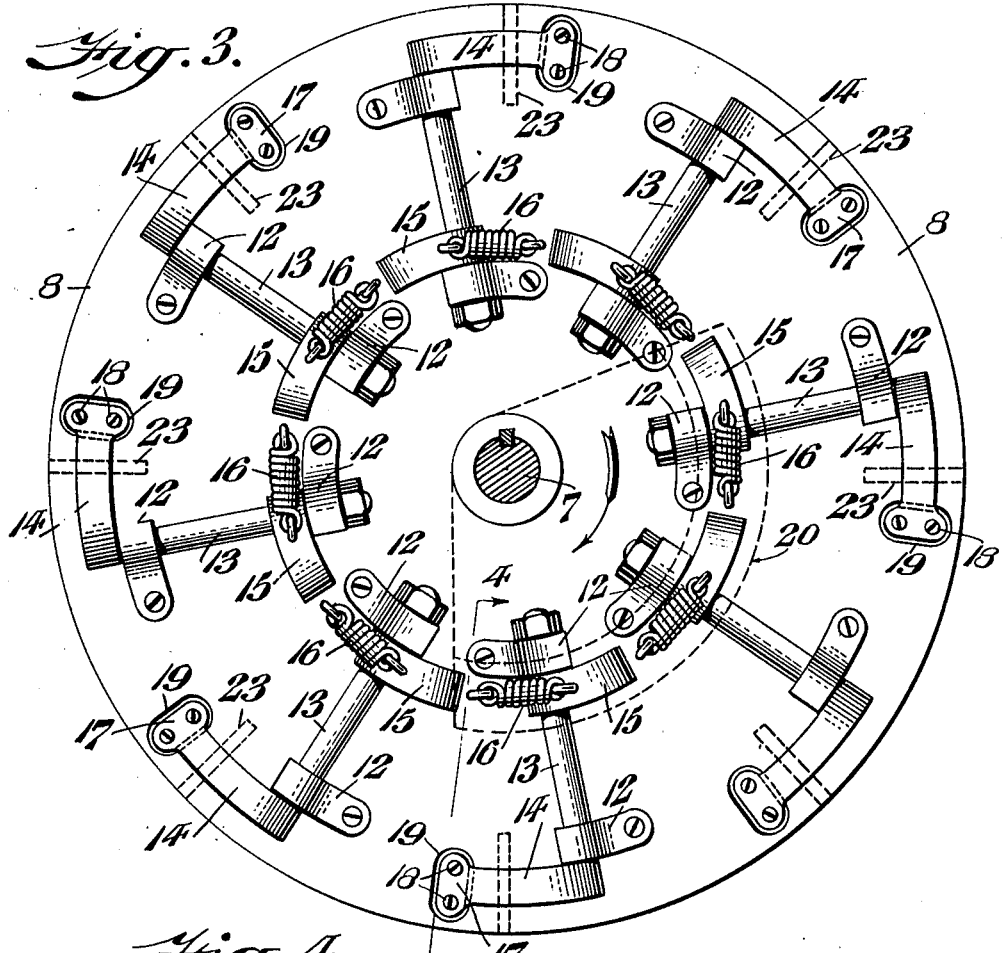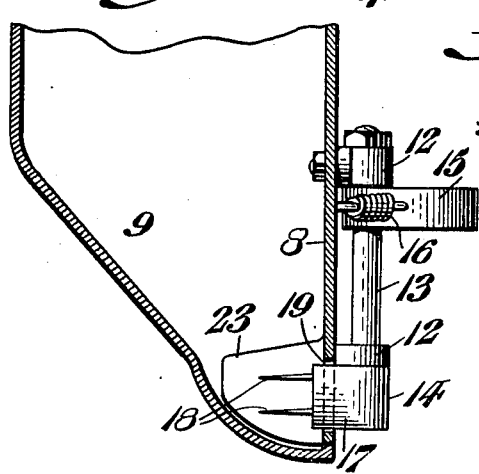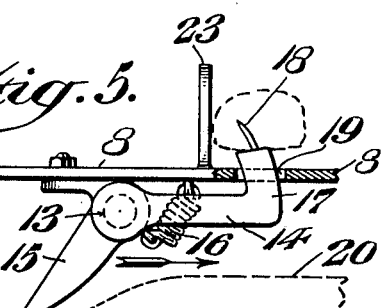

UNITED STATES PATENT OFFICE.

ALLEN McWHORTER, OF RIVERTON, NEW JERSEY.

POTATO-PLANTER.

1,314,683. Specification of Letters Patent. Patented Sept. 2, 1919.

Application filed February 4, 1919. Serial No. 274,868.

*To all whom it may concern:*

Be it known that I, ALLEN McWHORTER, a citizen of the United States, residing at Riverton, in the county of Burlington, State of New Jersey, have invented a new and useful Potato-Planter, of which the following is a specification.

My invention consists of a potato planter provided with novel means for impaling potatoes and releasing them so that they may be dropped uniformly and at regular intervals to the ground.

The invention is satisfactorily illustrated in the accompanying drawing, but the important instrumentalities thereof may be varied, and so it is to be understood that the invention is not limited to the specific details shown and described, as long as they are within the spirit or scope of the claims.

Figure 1 represents a top or plan view of a potato planter embodying my invention.

Fig. 2 represents a partial side elevation and partial vertical section thereof on line 2—2 Fig. 1.

Fig. 3 represents a side elevation on an enlarged scale of the head that carries the devices that cause primarily the picking or impaling of the potatoes, and next the release or stripping of the latter preparatory to dropping them to the ground.

Fig. 4 represents a vertical section on line 4—4 Fig. 3.

Fig. 5 represents a partial plan view and a part section of members shown in Fig. 4.

Figure 1:
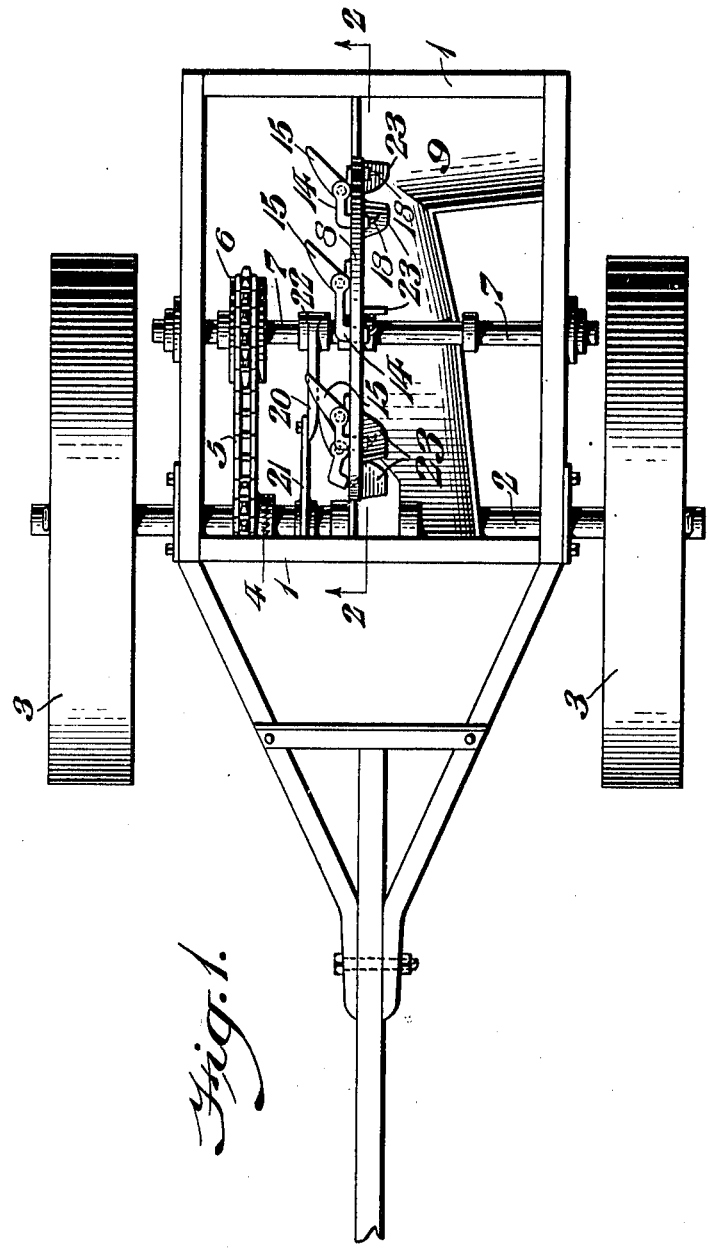

Fig. 6 represents a vertical section of a modification of a portion of the planter.

Similar numerals of reference indicate corresponding parts in the figures.

Referring to the drawings.

1 designates the frame of the device, the same being mounted by the axle 2 on the running wheels 3, said axle being provided with the clutch 4 around a member of which passes the sprocket chain 5 which also passes around the sprocket wheel 6 which latter is mounted on the horizontally extending countershaft or axle 7, and firmly secured thereto, said shaft 7 having its bearings on the frame 1 and adapted to be thrown in and out of gear by the operation of said clutch 4.

Mounted on the shaft 7 and firmly connected therewith is the rotatable head 8. Below said head is the potato distributing chamber 9 mounted on the frame 1. Said head as it rotates has its peripheral portion adapted to dip into said chamber and traverse therein from front to rear.

Mounted on the frame above the head 8 is a suitable potato supply hopper 10, a portion of which is shown in Fig. 1, and whose lower portion communicates with the distributing chamber 9 for evident purposes, as usual in such cases.

Connected with the frame in front of the head 8 is the vertically extending discharge chute 11 which is adapted to receive potatoes that are dropped from the head 8, and to direct them to the ground.

These several features broadly considered are well known in the art.

On the side of the head 8 are mounted by the ears 12 secured to said head, the radially extending rock shafts 13 one end of each of which carries the lever 14, and the other end carries the crank arm 15, said arm and lever projecting laterally respectively from the ends of the shaft with which they are connected, as most plainly shown in Figs. 3, 4 and 5. Attached to the arm 15 is the spring 16 which is also attached to the adjacent portion of the rotating head 8, the latter comprising one side of the distributing chamber 9, see Fig. 4, the tendency of said spring being to place said arm 15 and lever 14 in the position shown in Fig. 5.

The outer end of the lever 14 is enlarged forming the boss-like member 17 which is deflected laterally and forms a carrier for the impaling pins 18 which are secured thereto in any suitable manner. The head 8 has therein a passage 19 through which said carrier may play and cause the pins 18 to protrude into the distributing chamber 9, and to be withdrawn, it being noticed also as in Fig. 3 that the head 8 is formed with a series of such passages spaced around the peripheral portion of said head, one for each boss of the impaling pins.

20 designates a cam which is connected at the front with the plate 21 attached to the forward portion of the frame 1. The rear portion of said cam has thereon the boss or collar 22 which is mounted on the countershaft 7, said cam being so located that it is in the path of the arms 15, as the head 8 carries the latter around to said cam whereby said arms engage with said cam, the tendency is to operate the levers 14, so as to draw the carriers of the latter outwardly from the passages 19 and withdraw the impaling pins 18 from the distributing chamber 9, as shown at the left side of the head in Fig. 2.

Connected with the side of the head 8 adjacent to the passages 19 are the outwardly extending plates 23 forming abutments intended to assist in retaining the potatoes on the impaling pins when pierced by the latter.

The operation is as follows:—

As the device is drawn over the ground or field to be planted the shaft 7 receives rotation and this is imparted to the head 8. When an arm 15 reaches the cam 20 it rides thereover and so operates the lever 14 connected with the former, whereby the boss-like member or carrier of the impaling pins slides in outward direction in the passage 19 which it occupies and with it the impaling pins on said carrier. Then as the head 8 continues its rotation said arm clears said cam, this occurring about the time that said carrier reaches the base of the distributing chamber 9. Then the spring 16 draws said lever toward the head 8 causing the pin carrier to slide in its passage 19 quickly toward said chamber 9, whereby the impaling pins of said carrier are driven forcibly against a potato in the path of the same and so penetrate the potato as to take hold thereof whereby the potato is carried around with the rotating head 8 in the chamber 9 rearwardly and then upwardly, the potato being backed against the plate 23 as an abutment therefor whereby it remains sufficiently impaled by the pins as not to fall off of the same.

As the head rotates to the front of the frame, the arm 15 again reaches the cam 20 and rides thereover and is so operated by the same as to move the lever 14 and draw the carrier boss 17 of the same outwardly in the passage 19, and with it the impaling pins on said boss from said passage when the portion of the head 8 around said passage 19 has the potato carried against the same by the boss 17, and as the latter continues to be drawn outwardly its inner end presses against the potato and so strips the latter from the impaling pins, this being occasioned when the potato reaches the top of the chute 11, it then dropping from the latter to the ground into which it is planted. Simultaneously therewith, or about simultaneously therewith, the lever that carries the empty impaling pins is subjected to the action of the spring 16 thereof and so said lever is operated whereby said impaling pins are forcibly driven into the next potato in their path and so take hold thereof, whereby said potato is carried rearwardly through the chamber 9 and upwardly and forwardly in the same, when the stripping and other actions hereinbefore stated are repeated it being evident that the arms and levers are successively operated and with them the impaling pins and so the impaling of the potatoes on the pins therefor and the stripping of the same from the latter are uniformly occasioned.

In Fig. 6, I show an impaling pin lever 14ˣ connected with an arm 24ˣ integral therewith and mounted on the ear 25 which is connected with the head 8ˣ, this being a modification of similar members shown in the other figures, producing however, similar results.

Attention is drawn to the fact that the impaling pins 18 are made in laterally curved form as most plainly shown in Fig. 5, so as to point toward the abutment 23. By this provision the pins when projected against a potato in their path strike the same with a shock and so single out said potato from its neighbors that it is directed laterally to said abutment and impelled against the same while it pushes the neighboring potato away from the one that is impaled, whereby the impalement is reliably effected. Then when the pins enter the potato owing to their laterally curved form they turn into the same laterally toward the abutment, and as it were are hooked into the potato, and thus take hold of the same so firmly that it will not fall off of the pins as they are carried around by the rotating head 8, until they reach the place where they are to be dropped, when they will be stripped from the pins as has been stated.

Attention is also drawn to the fact that the passages 19 in the head extend transversely through from side to side of the same in a line of the direction of the countershaft 7, and so the levers 14 and consequently the bosses 17 are on the side of the head within the periphery thereof, so that the edge of said periphery is unobstructed as it enters and leaves the chamber 9, especially when it enters the latter, said edge then riding concentric on the bottom wall of said chamber 9 without projections that would strike said wall and interfere with the free rotation of the head, all as will be more apparent in Fig. 2.

As the head rotates and carries with it the levers 14, the bosses 17 on the latter are within the passages 1 whose walls assist in moving said bosses with said head, thus relieving said levers of strain when the bosses are weighted by the potatoes on the impaling pins. The bosses 17 limit the impalement of the potatoes and remove them from contact with the head 8.

Having thus described my invention what I claim as new and desire to secure by Letters Patent, is:—

1. In a potato planter, a potato distributing chamber, comprising a rotatable head forming a side wall thereof, a lever mounted on the side of said head, means for operating said lever in opposite directions, said head having therein a passage which extends therethrough from side to side removed from the periphery of said head, the free end of said lever being deflected laterally forming a boss like member which is adapted to occupy said passage and being freely movable therein.

2. In a potato planter, a rotatable head, an impaling pin, a potato distributing receptacle, a lever having its free end deflected laterally and adapted to carry said pin, said head having therein a passage through which said deflected free end of the lever is movable into and from said receptacle, and means on said head and lever for operating the latter in opposite directions, said passage extending through said head from side to side thereof and removed from the periphery of said head.

3. In a potato planter, a potato distributing chamber, comprising a rotatable head forming a side wall thereof having therein a passage extending through the same from side to side and removed from the periphery of said head, a lever mounted on the side of said head, means for operating said lever in opposite directions, said lever having on its free end a boss-like member which is adapted to freely occupy said passage and be guided therein in the motions of said lever, and an impaling pin projecting from said member into said distributing chamber.

4. In a potato planter, a rotatable head, having therein a passage extending through the same from side to side thereof, a shaft carrying said head, an impaling pin, a potato distributing receptacle on the frame and from which said pin is movable, a lever adapted to support the latter, a rock shaft on said head, and carrying said lever, an arm on said shaft adapted to operate the latter, a cam on said frame adapted to engage said arm and impart motion thereto in one direction, and a resilient member adapted to operate said arm in an opposite direction whereby said impaling pin is adapted to receive opposite motions relatively to the distributing receptacle.

5. In a potato planter, a rotatable head, a shaft on which the same is mounted, said head having a passage therethrough from side to side thereof, a potato distributing receptacle on the frame, a lever on said shaft, an impaling pin, said lever having its free end deflected laterally forming a carrier for said pin freely occupying said passage, an arm on said shaft adapted to operate said lever, a cam adapted to engage said arm and operate the same in one direction, and a resilient member adapted to operate said arm in an opposite direction whereby said pin receives its opposite motions respectively into and from the interior of said distributing receptacle.

6. In a potato planter, a rotatable head, an impaling pin, a potato-distributing receptacle, a lever having its free end deflected laterally and adapted to carry said pin, said head having therein a passage through which said deflected free end of the lever is movable into and from said receptacle, means on said head and lever for operating the latter in opposite directions, said passage extending through said head from side to side thereof and removed from the periphery of said head, and an abutment for assisting in retaining the potatoes on the impaling pin.

ALLEN McWHORTER.

Witnesses:
JOHN A. WIEDERSHEIM,
N. BUSSINGER.

Copies of this patent may be obtained for five cents each, by addressing the "Commissioner of Patents, Washington, D. C."